(12) United States Patent
Bangerter et al.

(10) Patent No.: US 10,088,162 B2
(45) Date of Patent: Oct. 2, 2018

(54) COMBUSTOR WITH GROMMET HAVING PROJECTING LIP

(71) Applicant: United Technologies Corporation, Hartford, CT (US)

(72) Inventors: James P. Bangerter, Manchester, CT (US); Kevin Joseph Low, Portland, CT (US); Jonathan M. Jause, Vernon, CT (US); Robert Sonntag, Bolton, CT (US); Reza Rezvani, Manchester, CT (US); David Kwoka, South Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 703 days.

(21) Appl. No.: 14/432,527

(22) PCT Filed: Mar. 12, 2013

(86) PCT No.: PCT/US2013/030691
§ 371 (c)(1),
(2) Date: Mar. 31, 2015

(87) PCT Pub. No.: WO2014/055116
PCT Pub. Date: Apr. 10, 2014

(65) Prior Publication Data
US 2015/0241063 A1    Aug. 27, 2015

Related U.S. Application Data

(60) Provisional application No. 61/708,133, filed on Oct. 1, 2012.

(51) Int. Cl.
*F02C 1/00* (2006.01)
*F23R 3/00* (2006.01)
(Continued)

(52) U.S. Cl.
CPC ............... *F23R 3/005* (2013.01); *F02C 7/18* (2013.01); *F23R 3/002* (2013.01); *F23R 3/06* (2013.01);
(Continued)

(58) Field of Classification Search
CPC .. F23R 3/002; F23R 3/50; F23R 3/005; F02C 7/18
(Continued)

(56) References Cited

U.S. PATENT DOCUMENTS 4,132,066 A    1/1979  Austin, Jr. et al.
4,503,130 A    3/1985  Bosshart et al.
(Continued)

FOREIGN PATENT DOCUMENTS

EP    0187731    9/1989
EP    2290289    3/2011
(Continued)

OTHER PUBLICATIONS

U.S. Appl. No. 13/437247. Combustor having a beveled grommet. Apr. 2, 2012.
(Continued)

*Primary Examiner* — Jason Shanske
(74) *Attorney, Agent, or Firm* — Carlson, Gaskey & Olds, P.C.

(57) ABSTRACT

A combustor includes a shell that bounds at least a portion of a combustion chamber. The shell includes a wall that has an orifice that opens to the combustion chamber. A grommet includes a body portion and a lip that projects from the body portion. The body portion and the lip carry a surface that extends around a passage through the grommet. At least a portion of the lip extends within the orifice of the wall of the shell.

23 Claims, 5 Drawing Sheets

(51) Int. Cl.
*F23R 3/50* (2006.01)
*F02C 7/18* (2006.01)
*F23R 3/46* (2006.01)
*F23R 3/06* (2006.01)

(52) U.S. Cl.
CPC .................. *F23R 3/46* (2013.01); *F23R 3/50* (2013.01); *F23R 2900/00017* (2013.01); *F23R 2900/03043* (2013.01); *F23R 2900/03045* (2013.01); *Y02T 50/675* (2013.01)

(58) Field of Classification Search
USPC .......................................................... 60/754
See application file for complete search history.

(56) References Cited

U.S. PATENT DOCUMENTS

| | | |
|---|---|---|
| 4,567,730 A | 2/1986 | Scott |
| 4,588,607 A | 5/1986 | Matarese et al. |
| 4,622,821 A | 11/1986 | Madden |
| 4,628,694 A | 12/1986 | Kelm et al. |
| 4,653,279 A | 3/1987 | Reynolds |
| 4,700,544 A | 10/1987 | Fucci |
| 5,687,572 A | 11/1997 | Schrantz et al. |
| 6,001,492 A | 12/1999 | Jackson et al. |
| 6,187,453 B1 | 2/2001 | Maloney |
| 6,358,002 B1 | 3/2002 | Good et al. |
| 6,408,628 B1 | 6/2002 | Pidcock et al. |
| 6,446,582 B1 | 9/2002 | Duong et al. |
| 6,764,779 B1 | 7/2004 | Liu et al. |
| 7,007,481 B2 | 3/2006 | McMasters |
| 7,534,076 B2 | 5/2009 | Agehara et al. |
| 7,543,383 B2 | 6/2009 | Patel et al. |
| 7,641,440 B2 | 1/2010 | Morrison et al. |
| 8,161,752 B2 | 4/2012 | Yankowich et al. |
| 2009/0308077 A1 | 12/2009 | Shelley et al. |
| 2010/0122537 A1 | 5/2010 | Yankowich et al. |
| 2010/0251723 A1 | 10/2010 | Chen et al. |
| 2011/0048024 A1 | 3/2011 | Snyder et al. |
| 2013/0255269 A1* | 10/2013 | McKenzie .............. F23R 3/007 60/772 |

FOREIGN PATENT DOCUMENTS

| | | |
|---|---|---|
| EP | 2834509 | 2/2015 |
| EP | 2971668 | 1/2016 |

OTHER PUBLICATIONS

International Search Report for PCT Application No. PCT/US2013/030691 completed Dec. 10, 2013.
International Preliminary Report on Patentability for PCT Application No. PCT/US2013/030691, dated Apr. 16, 2015.
Extended European Search Report for European Application No. 13844467.4 dated Jul. 29, 2016.

* cited by examiner

COMBUSTOR WITH GROMMET HAVING PROJECTING LIP

CROSS REFERENCE TO RELATED APPLICATION

This application claims priority to U.S. Provisional Application No. 61/708,133, which was filed 1 Oct. 2012 and is incorporated herein by reference.

BACKGROUND

This disclosure relates to combustors and, more particularly, to grommets used in combustors.

Combustors of gas turbine engines typically include a liner that extends around or partially around a combustion chamber. A bulkhead panel is provided at a forward end of the chamber to shield a forward section of the combustor from the relatively high temperatures in the chamber. Additionally, relatively cool air from outside of the combustor is directed through quench ports in the liners to control temperature of the combustion gases in the chamber.

SUMMARY

A combustor according to an exemplary aspect of the present disclosure includes a shell which binds at least a portion of a combustion chamber, the shell includes a wall which has an orifice opening to the combustion chamber, and a grommet includes a body portion and a lip projects from the body portion. The body portion and the lip carry a surface that extends around a passage through the grommet, at least a portion of the lip extends within the orifice of the wall of the shell.

In a further non-limiting embodiment of any of the foregoing examples, the surface flares at the lip.

In a further non-limiting embodiment of any of the foregoing examples, the surface transitions at a junction from a uniform section of the passage to a flared section of the passage.

In a further non-limiting embodiment of any of the foregoing examples, the junction is a corner edge.

In a further non-limiting embodiment of any of the foregoing examples, the junction is a rounded corner.

In a further non-limiting embodiment of any of the foregoing examples, the surface curves at the lip.

In a further non-limiting embodiment of any of the foregoing examples, the passage extends from a first side of the grommet at the lip to a second side of the grommet opposite of the lip, and at least one of the first side and the second side is non-planar.

In a further non-limiting embodiment of any of the foregoing examples, the first side is convex.

In a further non-limiting embodiment of any of the foregoing examples, the first side is concave.

In a further non-limiting embodiment of any of the foregoing examples, the other of the first side and the second side is planar.

In a further non-limiting embodiment of any of the foregoing examples, the first side is planar and the second side is non-planar.

A further non-limiting embodiment of any of the foregoing examples includes a radial gap between the lip and the wall of the shell with respect to a central axis of the passage.

A further non-limiting embodiment of any of the foregoing examples includes the shoulder projecting from the body portion and extending circumferentially around the lip.

A turbine engine according to an exemplary aspect of the present disclosure includes a compressor section, a combustor in fluid communication with the compressor section, and a turbine section in fluid communication with the combustor. The combustor includes a shell bounding at least a portion of a combustion chamber. The shell includes a wall having an orifice opening to the combustion chamber, and a grommet which includes a body portion and a lip projecting from the body portion. The body portion and the lip carries a surface that extends around a passage through the grommet, at least a portion of the lip extends within the orifice of the wall of the shell.

A heat shield for a combustor, the heat shield according to an exemplary aspect of the present disclosure includes a first heat shield panel which includes an orifice, and a second heat shield panel which includes a wall and a grommet integral with the wall. The grommet projects from the wall and defining a though-hole there through that is arranged with respect to the orifice to communicate fluid through the orifice.

In a further non-limiting embodiment of any of the foregoing examples, the grommet has a thickness between an exterior-facing surface and an interior-facing surface, and the thickness is stepped-down in multiple annular locations that are radially exterior of the through-hole.

In a further non-limiting embodiment of any of the foregoing examples, the first step-down forms a lip, a second step-down from the first step-down forms a shoulder and a third step down transitions the grommet to the wall.

In a further non-limiting embodiment of any of the foregoing examples, the outer diameter of the shoulder is larger than the orifice in the first heat shield panel and an outer diameter of the lip is smaller than the orifice in the first heat shield panel.

In a further non-limiting embodiment of any of the foregoing examples, the shoulder bears against the first heat shield panel such that the lip extends through the orifice and there is a radial gap between the lip and the orifice.

In a further non-limiting embodiment of any of the foregoing examples, the exterior end of the through-hole adjacent a tip of the lip transitions to an axially exterior edge of the lip by way of a chamfer.

In a further non-limiting embodiment of any of the foregoing examples, the chamfer extends a full axial height of the lip and about half of a radial thickness of the lip.

In a further non-limiting embodiment of any of the foregoing examples, the exterior end of the through-hole adjacent a tip of the lip transitions to an axially exterior edge of the lip by way of a fillet that extends a full axial height of the lip and full radial thickness of the lip and forms a quarter-round surface.

In a further non-limiting embodiment of any of the foregoing examples, the exterior end of the through-hole adjacent a tip of the lip transitions to an axially exterior edge of the lip by way of a fillet that extends a full radial thickness of the lip and forms a half-round surface.

In a further non-limiting embodiment of any of the foregoing examples, the exterior end of the through-hole adjacent a tip of the lip transitions to an axially exterior edge of the lip by way of two fillets that extend a partial radial thickness of the lip, with a chamfer radially intermediate the two fillets.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
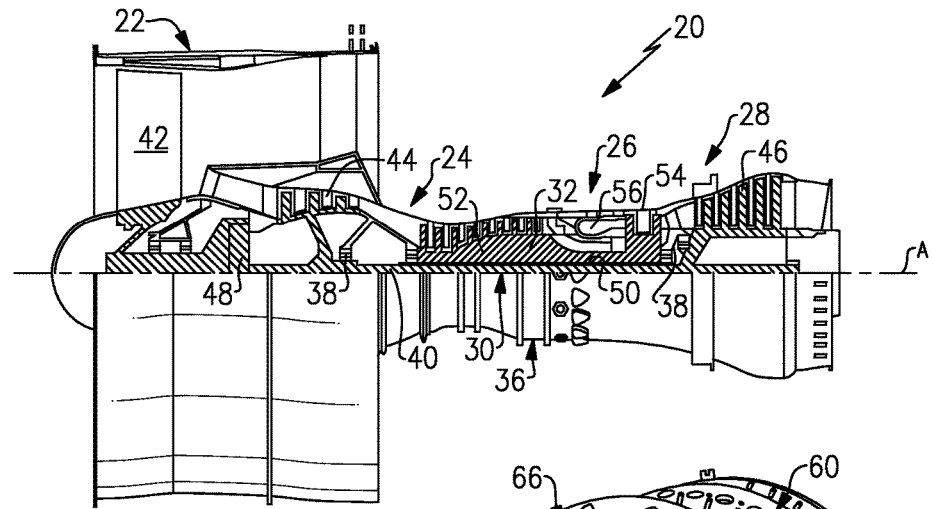
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines, including three-spool architectures and ground-based turbines.

The engine 20 generally includes a first spool 30 and a second spool 32 mounted for rotation about an engine central axis A relative to an engine static structure 36 via several bearing systems 38. It should be understood that various bearing systems 38 at various locations may alternatively or additionally be provided.

The first spool 30 generally includes a first shaft 40 that interconnects a fan 42, a first compressor 44 and a first turbine 46. The first shaft 40 is connected to the fan 42 through a gear assembly of a fan drive gear system 48 to drive the fan 42 at a lower speed than the first spool 30. The second spool 32 includes a second shaft 50 that interconnects a second compressor 52 and second turbine 54. The first spool 30 runs at a relatively lower pressure than the second spool 32. It is to be understood that "low pressure" and "high pressure" or variations thereof as used herein are relative terms indicating that the high pressure is greater than the low pressure. An annular combustor 56 is arranged between the second compressor 52 and the second turbine 54. Although the combustor 56 of this example is annular, it is to be understood that the combustor 56 could alternatively be a can-type combustor. The first shaft 40 and the second shaft 50 are concentric and rotate via bearing systems 38 about the engine central axis A which is collinear with their longitudinal axes.

The core airflow is compressed by the first compressor 44 then the second compressor 52, mixed and burned with fuel in the annular combustor 56, then expanded over the second turbine 54 and first turbine 46. The first turbine 46 and the second turbine 54 rotationally drive, respectively, the first spool 30 and the second spool 32 in response to the expansion.

The engine 20 is a high-bypass geared aircraft engine that has a bypass ratio that is greater than about six (6), with an example embodiment being greater than ten (10), the gear assembly of the fan drive gear system 48 is an epicyclic gear train, such as a planetary gear system or other gear system, with a gear reduction ratio of greater than about 2.3:1 and the first turbine 46 has a pressure ratio that is greater than about 5. The first turbine 46 pressure ratio is pressure measured prior to inlet of first turbine 46 as related to the pressure at the outlet of the first turbine 46 prior to an exhaust nozzle. The first turbine 46 has a maximum rotor diameter and the fan 42 has a fan diameter such that a ratio of the maximum rotor diameter divided by the fan diameter is less than 0.6. It should be understood, however, that the above parameters are only exemplary.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 feet, with the engine at its best fuel consumption. To make an accurate comparison of fuel consumption between engines, fuel consumption is reduced to a common denominator, which is applicable to all types and sizes of turbojets and turbofans. The term is thrust specific fuel consumption, or TSFC. This is an engine's fuel consumption in pounds per hour divided by the net thrust. The result is the amount of fuel required to produce one pound of thrust. The TSFC unit is pounds per hour per pounds of thrust (lb/hr/lb Fn). When it is obvious that the reference is to a turbojet or turbofan engine, TSFC is often simply called specific fuel consumption, or SFC. "Low fan pressure ratio" is the pressure ratio across the fan blade alone, without a Fan Exit Guide Vane system. The low fan pressure ratio as disclosed herein according to one non-limiting embodiment is less than about 1.45. "Low corrected fan tip speed" is the actual fan tip speed in feet per second divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 feet per second.

Figure 2:
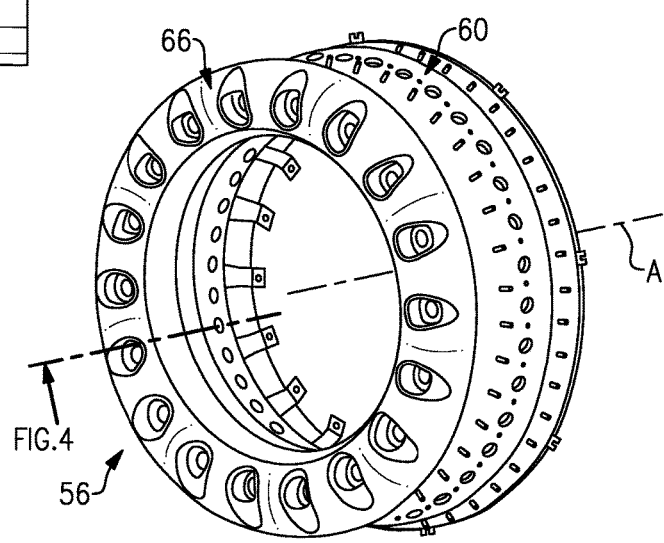
FIG. 2 illustrates an isolated, perspective view of a combustor of the gas turbine engine of FIG. 1.
Figure 3:
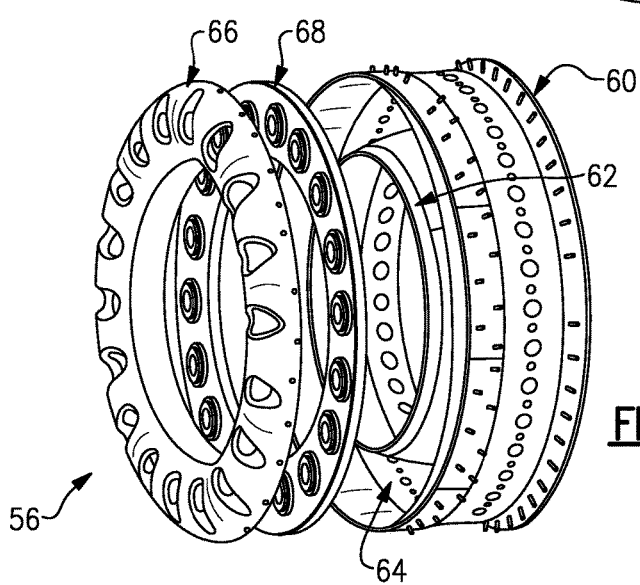
FIG. 3 illustrates an exploded, perspective view of the combustor of FIG. 2.

FIG. 2 shows a perspective, isolated view of the combustor 56, and FIG. 3 illustrates an exploded view of the combustor 56. In this example, the combustor 56 includes an annular outer shell 60, an annular inner shell 62 that is spaced radially inwards of the annular outer shell 60 to define an annular combustion chamber 64 there between, an annular hood 66 and a bulkhead 68. The annular outer shell 60, the annular inner shell 62, the annular hood 66 and the bulkhead 68 each extend circumferentially around the engine central longitudinal axis A. Of course, the specific design of the combustor 56 may differ from the illustrated, non-limiting example.

Figure 4:
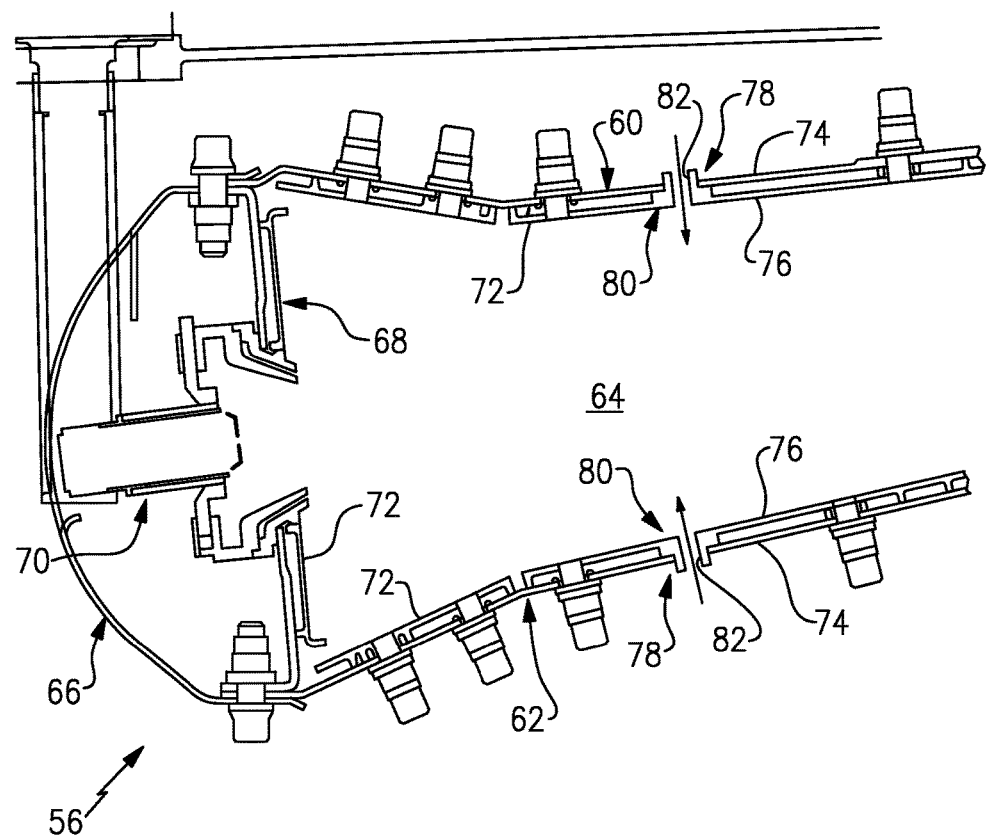
FIG. 4 illustrates a cross-section of the combustor of FIG. 2.

FIG. 4 shows a cross-section of the combustor 56 according to the section line shown in FIG. 2. The combustor 56 receives a fuel supply through a fuel nozzle 70. The fuel supply is ignited and injected into the combustion chamber 64. To resist the high combustion temperatures, the annular outer shell 60, the annular inner shell 62 and the bulkhead 68 can include heat shield panels 72, which can be effusion cooled.

Each of the annular outer shell 60 and the annular inner shell 62 includes a first side heat shield panel or wall 74 and a second side heat shield panel or wall 76. In this example, the first side walls 74 are cold side walls with respect to the combustion chamber 64 and the second side walls 76 are hot side walls. The first side walls 74 include orifices 78 that open to the combustion chamber 64. Respective grommets 80 are arranged at least partially within the orifices 78. Each of the grommets 80 includes a passage 82 that is configured to communicate air, represented as flow F, from outside of the combustion chamber 64 into the combustion chamber 64.

The operating pressure within the combustion chamber 64 is lower than the air pressure in the surrounding environment outside of the combustor 56. This pressure differential drives surrounding air into the combustion chamber 64 through the passages 82. Although an influx of surrounding air is desired, variance in the flow of the air into the combustion chamber 64 is undesirable and can debit the performance of the combustor 56 by altering the combustion stoichiometry and/or generating undesirable emission products. The grommets 80 serve as funnels to control airflow F into the combustion chamber 64.

Figure 5:
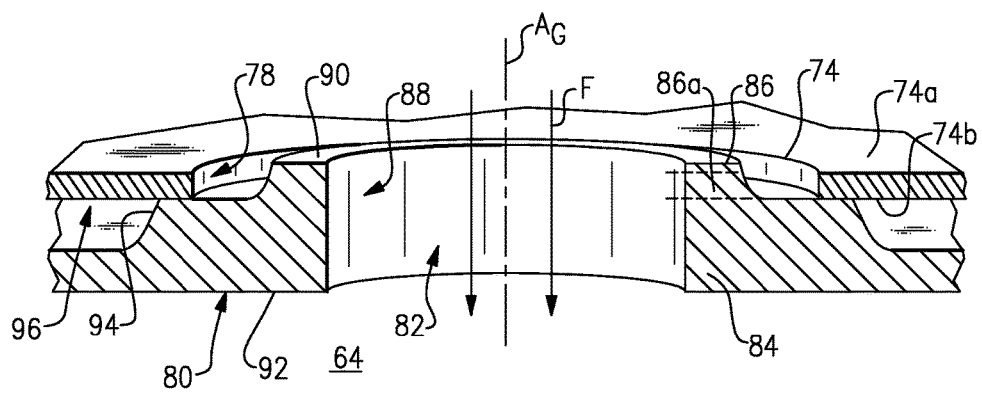
FIG. 5 illustrates a cross-section of a grommet of the combustor of FIG. 4.

FIG. 5 illustrates an example of one of the grommets 80, which can be a stand-alone piece or integrated into the second side wall 76. The grommet 80 includes a body portion 84 and a lip 86 that projects from the body portion 84. The body portion 84 and the lip 86 carry a surface 88 that extends around the passage 82 through the grommet 80. At least a portion of the lip 86 extends within the orifice 78 of the first side wall 74, with a radial gap G between the lip 86 and the first side wall 74. For example, the orifice 78 extends between a first surface 74a of the first side wall 74 and an opposed, second surface 74b. In this example, portion 86a of the lip 86 extends within the orifice 78, as represented by the dashed lines extending from the surfaces 74a/74b.

The passage 82 of the grommet 80 extends between a first facial surface 90 at the lip 86 and a second facial surface 92 opposite of the lip 86. The second facial surface 92 bounds at least a portion of the combustion chamber 64, while the first facial surface 90 faces in a direction toward the exterior or outside environment of the combustion chamber 64. Thus, the flow F from the exterior of the combustion chamber 64 enters through the first facial surface 90 at the lip 86 and flows through the passage 82 into the combustion chamber 64. The passage 82 extends axially along a central axis $A_G$.

In this example, the grommet 80 also includes a shoulder 94 that projects from the body portion 84 and extends circumferentially around the lip 86. The shoulder 94 bears against the second surface 74b of the second side wall 76 and serves to space the first side wall 74 from the second facial surface 92 such that there is an open space 96 between the grommet 80 and the second side wall 76. This open space 96 can be used for communicating flow of a cooling fluid to manage the temperature of the heat shield panels 72, for example. The shoulder 94 also serves as a sealing surface with the first side wall 74 and to properly locate the lip 86 with respect to the orifice 78.

In other words, a grommet is illustrated in FIG. 5 which is integrally formed with the heat shield wall 76. The grommet has a through-hole extending between its exterior facing surface and its interior facing surface. The grommet thickness is stepped down at two annular locations which are radially exterior to the through-hole. The first step down forms a lip, the second step down forms a shoulder and the third step down transitions the grommet to the heat shield wall 76. The outer diameter of the shoulder is larger than the orifice in the chamber wall 74, and the outer diameter of the lip is smaller than the orifice. This configuration forms a radial gap G between the lip and the orifice when the shoulder is disposed against the chamber wall so that lip extends through the orifice. In addition, the resulting space between the heat shield and the chamber wall serves as a cooling fluid cavity. The lip 86 smoothly funnels the flow F. For example, relatively abrupt corners, known as break edges, can induce variation in flow. The variation can be represented by a coefficient of discharge. The coefficient of discharge, or CD, is defined as an effective cross-sectional flow area, or FA, divided by the cross-sectional area of an opening, or OA, so that CD=FA/OA. The lip 86 reduces variation in the coefficient of discharge and thus reduces variation in flow F into the combustion chamber 64. The reduction in variability provides greater control over the temperature distribution of the combustion gases in the combustion chamber 64.

Figure 6:
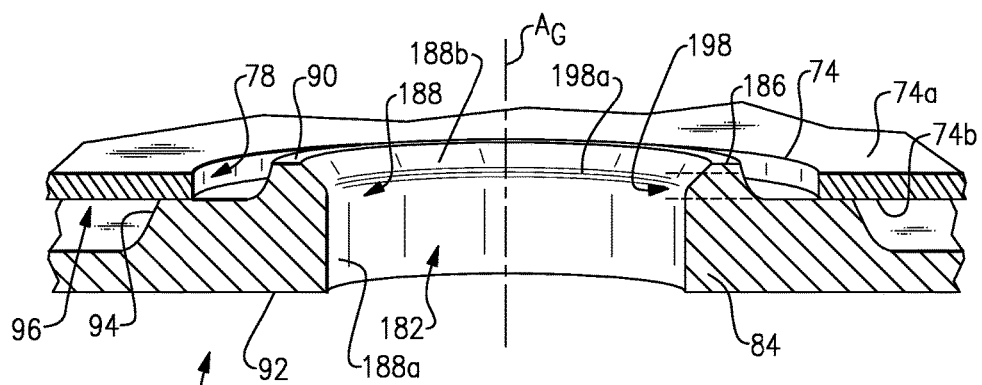
FIG. 6 illustrates another example grommet.

In the above example, the surface 88 that bounds and defines the passage 82 is cylindrical and of uniform diameter along the length of the passage 82. FIG. 6 shows a modified example of a grommet 180 that can be used in the combustor 56. In this disclosure, like reference numerals designate like elements where appropriate and reference numerals with the addition of one-hundred or multiples thereof designate modified elements that are understood to incorporate the same features and benefits of the corresponding elements.

In this example, the surface 188 that bounds the passage 182 through the grommet 180 flares radially outwardly at the lip 186 such that the passage 182 broadens through the lip 186. For example, the surface 188 includes a first portion 188a that represents a uniform section of the passage 182. In this example, the portion 188a has a constant diameter. The portion 188a transitions at a junction 198 to a second portion 188b of the surface 188. For example, the surface 188 begins to flare outwardly at the junction 198 such that the second portion 188b forms a frustoconical surface. In this example, the transition at the junction 198 between the first portion 188a and the second portion 188b includes a rounded corner 198a. The rounded corner 198a provides a smooth transition between the portions 188a/188b of the surface 188. Further, the junction 198 is at least partially within the orifice 178, as represented by the dashed lines extending from the surfaces 74a/74b of the first side wall 74.

In other words, in the alternative embodiment, an exterior end of the through-hole transitions to the axially exterior edge of the lip via a chamfer. The chamfer extends substantially the full axial height and about half the radial thickness of the lip. The transition at the through-hole to the chamfer is smoothly blended.

Figure 7:
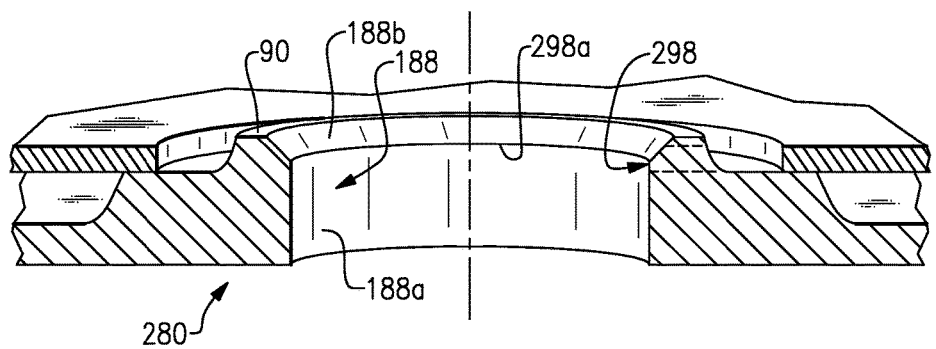
FIG. 7 illustrates another example grommet having a corner edge junction.

FIG. 7 shows another modified version of an example grommet 280 that is somewhat similar to the grommet 180 of FIG. 6. The grommet 280 also includes a junction 298 between the portions 188a/188b of the surface 188. In this example, the junction 298 includes a distinct edge 298a where the portions 188a/188b meet.

In other words, the FIG. 7 embodiment is the same as the FIG. 6 embodiment, except the transition at the through-hole to the chamfer is not blended.

Figure 8:
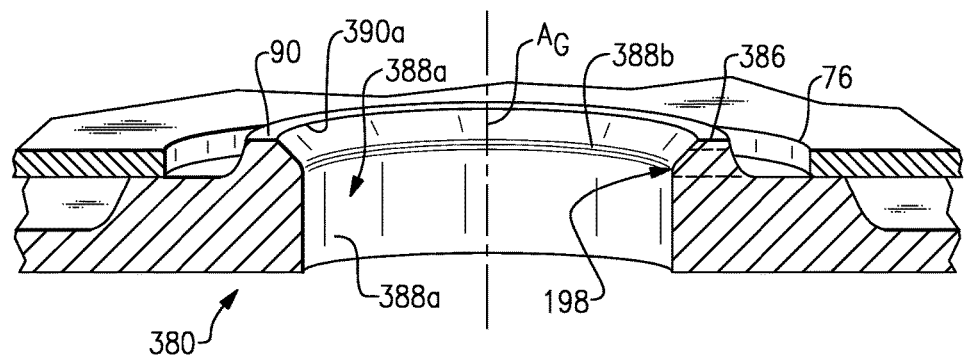
FIG. 8 illustrates another example grommet having a radially curved surface portion.

FIG. 8 illustrates another example grommet 380. Whereas the second portion 188b is frustoconical in the examples of FIGS. 6 and 7, the second portion 388b of the surface 388 of grommet 380 is radially curved with respect to axis $A_G$ to facilitate smooth airflow over the lip 386. In this example, the curvature of the second portion 388b extends axially from the junction 198 to the first facial surface 90, at which there is a distinct edge 390a distinguishing the second portion 388b from the first facial surface 90.

Figure 9:
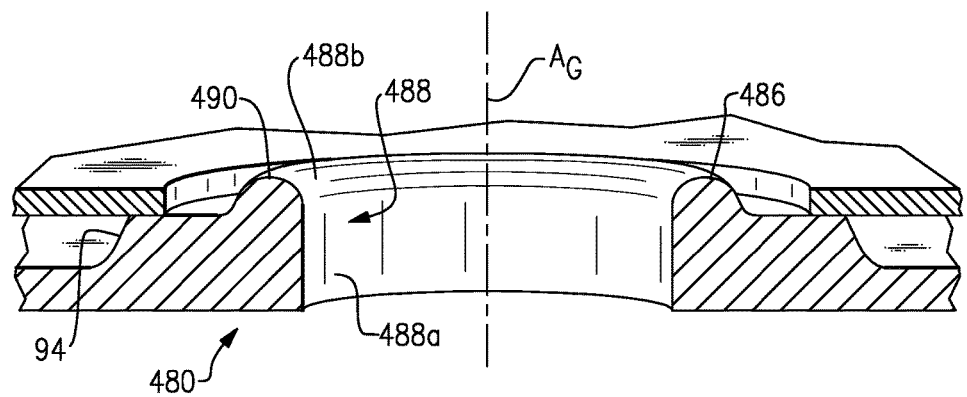
FIG. 9 illustrates another example grommet having a curved surface portion that extends over a lip to a shoulder of the grommet.

In other words, in the alternative embodiment, an exterior end of the through-hole transitions to the axially exterior edge of the lip via a fillet. The fillet extends substantially the full axial height and radial thickness of the lip and forms a quarter-round surface. Alternatively, as shown in FIG. 9, the second portion 488b of the surface 488 radially curves over the entire lip 486 to the shoulder 94. In this regard, the first facial surface 490 is considered to be the tangent at the tip of the curved portion 488 of the lip 486.

In other words, in this alternative embodiment, the fillet extends over the full radial thickness of the lip and forms a half round surface.

Figure 10:
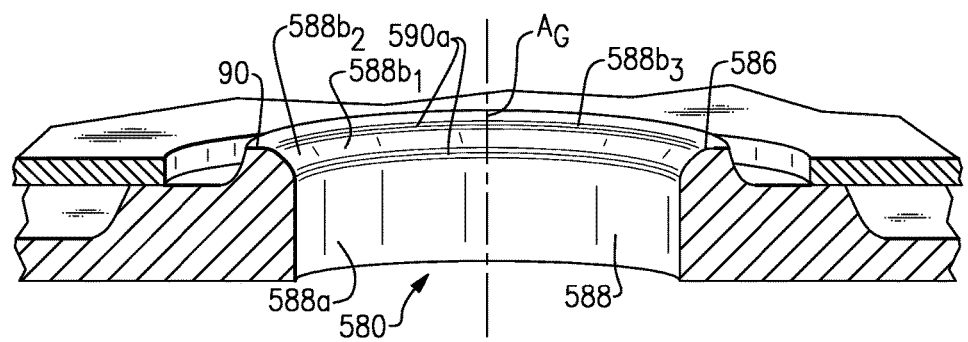
FIG. 10 illustrates another example grommet having two curved surface portions and frustoconic portion radially intermediate the two curved surface portions.

FIG. 10 illustrates another example grommet 580. This alternative embodiment combines features of the examples shown in FIGS. 6 and 8. In this example, the portions $588b_1$ and $588b_2$ of the surface 588 are radially curved with respect to axis $A_G$, similar to the second portion 388b in FIG. 8. The portion $588b_2$ is radially intermediate portions $588b_1$ and $588b_2$ and forms a frustoconical surface, similar to the second portion 188b in FIG. 6. There are distinct edges 590a between portions $588b_1$ and $588b_2$ and portion $588b_2$. In other words, an exterior end of the through-hole adjacent a tip of the lip transitions to an axially exterior edge of the lip by way of two fillets that extend a partial radial thickness of the lip, with a chamfer radially intermediate the two fillets.

Figure 11:
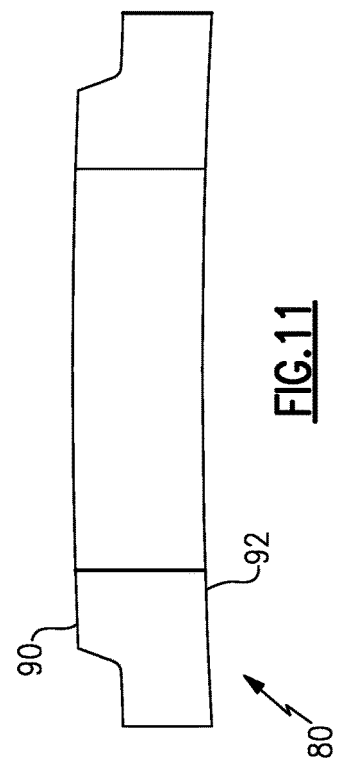
FIG. 11 illustrates a grommet having a convex facial surface and a concave facial surface.
Figure 12:
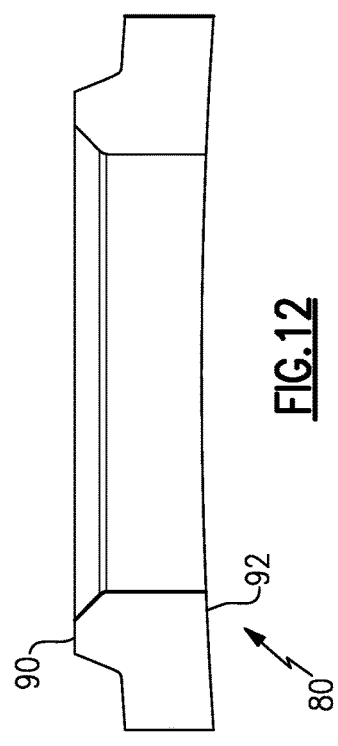
FIG. 12 illustrates a grommet having a planar facial surface and a concave facial surface.
Figure 13:
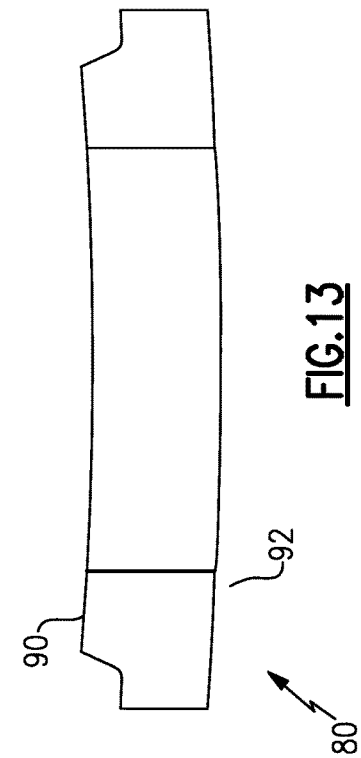
FIG. 13 illustrates a grommet having a concave facial surface and a convex facial surface.

In further examples, at least one of the first facial surface 90 or the second facial surface 92 is non-planar. Referring to FIG. 11, the first facial surface 90 is convex and the second facial surface 92 is concave. That is, the grommet 80 has a curvature that can closely match the curvature of the shell 60. Depending upon the location of the grommet 80 in the combustor 56, the grommet 80 can be designed to have curvatures on the first facial surface 90, the second facial surface 92 or both. For example, as shown in FIG. 12, the first facial surface 90 is planar and the second facial surface 92 is concave. In another alternative, as shown in FIG. 13, the first facial surface 90 is concave and the second facial surface 92 is convex. For example, the grommet 80 follows the curvature of the shell 62 of the inner diameter of the combustor 56. In another alternative shown in FIG. 14, the first facial surface 90 is planar and the second facial surface 92 is convex.

Figure 14:
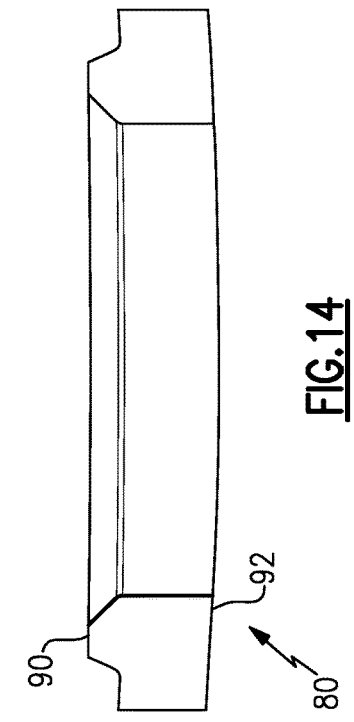
FIG. 14 illustrates a grommet having a planar facial surface and a convex facial surface.

In other words, in FIGS. 11-14, the axially outer surface of lip follows the curvature of the heat shield panel, or is planar, for ease of manufacturing. The embodiments in FIGS. 11 and 13 have through holes like that in FIG. 6, while FIGS. 12 and 14 illustrate embodiments where the through-hole transitions via the above noted chamfer. The axial top of the lip in FIG. 11 is conical while that in FIG. 12 is planar, and both are for an outer diameter heat shield panel, with respect to the outer diameter of the combustor 56. Similarly, the axial top of the lip in FIG. 11 is conical while that in FIG. 12 is planar, and both are for an inner diameter heat shield panel with respect to the inner diameter of the combustor 56.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A combustor comprising:
   a shell bounding at least a portion of a combustion chamber, the shell including a wall having an orifice opening to the combustion chamber; and
   a grommet including a body portion and a lip projecting from the body portion, the body portion and the lip carrying a surface that extends around a passage through the grommet, at least a portion of the lip extending radially into the orifice of the wall of the shell with respect to a central axis of the passage.

2. The combustor as recited in claim 1, wherein the surface flares at the lip.

3. The combustor as recited in claim 1, wherein the surface transitions at a junction from a uniform section of the passage to a flared section of the passage.

4. The combustor as recited in claim 3, wherein the junction is a corner edge.

5. The combustor as recited in claim 3, wherein the junction is a rounded corner.

6. The combustor as recited in claim 1, wherein the surface curves at the lip.

7. The combustor as recited in claim 1, wherein the passage extends from a first side of the grommet at the lip to a second side of the grommet opposite of the lip, and at least one of the first side and the second side is non-planar.

8. The combustor as recited in claim 7, wherein the first side is convex.

9. The combustor as recited in claim 7, wherein the first side is concave.

10. The combustor as recited in claim 7, wherein the other of the first side and the second side is planar.

11. The combustor as recited in claim 10, wherein the first side is planar and the second side is non-planar.

12. The combustor as recited in claim 1, further comprising a radial gap between the lip and the wall of the shell with respect to the central axis of the passage.

13. The combustor as recited in claim 1, further comprising a shoulder projecting from the body portion and extending circumferentially around the lip.

14. A turbine engine comprising:
   a compressor section;
   a combustor in fluid communication with the compressor section; and
   a turbine section in fluid communication with the combustor,
   the combustor including,
      a shell bounding at least a portion of a combustion chamber, the shell including a wall having an orifice opening to the combustion chamber;

a grommet including a body portion and a lip projecting from the body portion, the body portion and the lip carrying a surface that extends around a passage through the grommet, at least a portion of the lip extending radially into the orifice of the wall of the shell with respect to a central axis of the passage.

15. A heat shield for a combustor, the heat shield comprising:
a first heat shield panel including an orifice; and
a second heat shield panel including a wall and a grommet integral with the wall, the grommet projecting from the wall and defining a through-hole there through that is arranged with respect to the orifice to communicate fluid through the orifice, wherein the grommet has a thickness between an exterior-facing surface and an interior-facing surface, and the thickness is stepped-down in multiple annular locations that are radially exterior of the through-hole.

16. The heat shield as recited in claim 15, wherein a first step-down forms a lip, a second step-down from the first step-down forms a shoulder and a third step down transitions the grommet to the wall.

17. The heat shield as recited in claim 16, wherein an outer diameter of the shoulder is larger than the orifice in the first heat shield panel and an outer diameter of the lip is smaller than the orifice in the first heat shield panel.

18. The heat shield as recited in claim 17, wherein the shoulder bears against the first heat shield panel such that the lip extends through the orifice and there is a radial gap between the lip and the orifice.

19. The heat shield as recited in claim 16, wherein an exterior end of the through-hole adjacent a tip of the lip transitions to an axially exterior edge of the lip by way of a chamfer.

20. The heat shield as recited in claim 19, wherein the chamfer extends a full axial height of the lip and about half of a radial thickness of the lip.

21. The heat shield as recited in claim 16, wherein an exterior end of the through-hole adjacent a tip of the lip transitions to an axially exterior edge of the lip by way of a fillet that extends a full axial height of the lip and full radial thickness of the lip and forms a quarter-round surface.

22. The heat shield as recited in claim 16, wherein an exterior end of the through-hole adjacent a tip of the lip transitions to an axially exterior edge of the lip by way of a fillet that extends a full radial thickness of the lip and forms a half-round surface.

23. The heat shield as recited in claim 16, wherein an exterior end of the through-hole adjacent a tip of the lip transitions to an axially exterior edge of the lip by way of two fillets that extend a partial radial thickness of the lip, with a chamfer radially intermediate the two fillets.

* * * * *